(12) United States Patent  
Baika

(10) Patent No.: US 7,939,208 B2  
(45) Date of Patent: May 10, 2011

(54) FUEL CELL SYSTEM

(75) Inventor: Toyokazu Baika, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 543 days.

(21) Appl. No.: 12/084,053

(22) PCT Filed: Oct. 26, 2006

(86) PCT No.: PCT/JP2006/321366  
§ 371 (c)(1),  
(2), (4) Date: Apr. 24, 2008

(87) PCT Pub. No.: WO2007/049691  
PCT Pub. Date: May 3, 2007

(65) Prior Publication Data  
US 2009/0162705 A1    Jun. 25, 2009

(30) Foreign Application Priority Data  
Oct. 27, 2005   (JP) ................................. 2005-312742

(51) Int. Cl.  
*H01M 8/04* (2006.01)

(52) U.S. Cl. ........................................ 429/410; 429/412

(58) Field of Classification Search ........................ None  
See application file for complete search history.

(56) References Cited

U.S. PATENT DOCUMENTS

| | | | |
|---|---|---|---|
| 6,432,177 B1 | 8/2002 | Dallas et al. | |
| 6,638,339 B2 | 10/2003 | Dallas et al. | |
| 7,101,419 B2 | 9/2006 | Dallas et al. | |
| 2002/0094469 A1* | 7/2002 | Yoshizumi et al. | 429/34 |
| 2004/0247985 A1 | 12/2004 | Takebe et al. | |
| 2005/0074640 A1 | 4/2005 | Hori et al. | |
| 2007/0003800 A1 | 1/2007 | Dallas et al. | |
| 2008/0026270 A1 | 1/2008 | Takebe et al. | |

FOREIGN PATENT DOCUMENTS

| | | |
|---|---|---|
| JP | 03-093166 A | 4/1991 |
| JP | 04-206160 A | 7/1992 |
| JP | 07-094200 A | 4/1995 |
| JP | 08-138703 | 5/1996 |
| JP | 2003-317783 A | 11/2003 |
| JP | 2004-508693 A | 3/2004 |
| JP | 2004-327429 A | 11/2004 |
| JP | 2005-100967 A | 4/2005 |
| JP | 2005-116353 A | 4/2005 |
| JP | 2005-129494 A | 5/2005 |
| JP | 2006-286439 A | 10/2006 |

* cited by examiner

*Primary Examiner* — John S Maples  
(74) *Attorney, Agent, or Firm* — Kenyon & Kenyon LLP

(57) ABSTRACT

Fuel cell system comprising impurity adsorbing means for adsorption of impurities contained in oxidation gas fed to fuel cell; impurity emitting means for emission of impurities adsorbed by the impurity adsorbing means from the impurity adsorbing means; impurity outlet passage for pass of impurities emitted from the impurity emitting means; and diluting means for dilution of the impurities emitted by the impurity emitting means, so that any adsorbed impurities are diluted by the diluting means before emission outside the system. Consequently, not only can impurities contained in the oxidation gas fed to fuel cell be effectively removed but also before emission of the removed impurities, there can be conducted lowering of influence on human health and environment.

11 Claims, 3 Drawing Sheets

FUEL CELL SYSTEM

This is a 371 national phase application of PCT/JP2006/321366 filed 26 Oct. 2006, claiming priority to Japanese Patent Application No. 2005-312742 filed 27 Oct. 2005, the contents of which are incorporated herein by reference.

TECHNICAL FIELD OF THE INVENTION

The present invention relates to a fuel cell system that generates electric energy through electrochemical reaction.

BACKGROUND ART

A fuel cell system obtains electric energy by feeding combustion gas such as hydrogen and oxidation gas that has oxygen to a fuel cell and then electrochemically reacting them via an electrolyte. Air is employed as the oxidation gas fed to the fuel cell, and depending on places to be used, gaseous components (impurities) such as sulfur compound, nitrogen oxide, and the like are also contained. Having such impurities fed to the fuel cell may possibly deteriorate the fuel cell stack and cause decrease in generating efficiency.

As conventional fuel cell systems, there is a system that includes an impurity removing means for removing impurities contained in oxidation gas in the course of feeding the oxidation gas from an oxidation gas feeding device to a fuel cell, in order to prevent the impurities from flowing into the fuel cell (see Patent Documents 1, 2, 3, 4, and 5).

According to the fuel cell systems described above, it is possible to remove the impurities contained in the oxidation gas fed to the fuel cell, thereby preventing deterioration of the fuel cell stack. However, the impurity removing means has a limited capacity available for removal of impurities, and thus was required to be replaced or subjected to a regeneration process after being used for a certain amount.

In view of such a problem, a fuel cell system has been proposed as follows. An impurity removing means of this fuel cell system is capable of separating impurities removed from oxidation gas, and can output the impurities obtained by the impurity removal means from the system as occasion demands (see Patent Document 6, for example). This allows for regeneration and continuous use of the impurity removing means.

Patent Document 1: Published Japanese Translation of PCT Application No. 2004-508693
Patent Document 2: Japanese Unexamined Patent Publication No. 2005-116353
Patent Document 3: Japanese Unexamined Patent Publication No. 2004-327429
Patent Document 4: Japanese Unexamined Patent Publication No. 8-138703
Patent Document 5: Japanese Unexamined Patent Publication No. 2005-100967
Patent Document 6: Japanese Unexamined Patent Publication No. 2005-129494

SUMMARY OF THE INVENTION

Problem to be Solved by the Invention

The fuel cell system described above outputs impurities, which has been separated from oxidation gas by the impurity removing means, through an outlet passage that is in communication with an oxidation gas feeding passage. However, a large amount of impurities may sometimes be output from the impurity removing means at one time. The large amount of impurities may be used again as oxidation gas for this or another fuel cell system, and may possibly have influence on operation of such fuel cell system.

The present invention is provided in view of the above-mentioned problem and is purposed to provide a fuel cell system that is capable of effectively removing impurities contained in oxidation gas fed to a fuel cell, where the removed impurities are prevented from exerting negative influence on outside systems and the like including the system itself.

Means for Solving the Problem

The present invention is a fuel cell system that is characterized in including: a fuel cell that obtains electric power through electrochemical reaction between hydrogen gas and oxidation gas; an oxidation gas feeding passage for passage of oxidation gas fed to the fuel cell; an impurity adsorbing means that is disposed on the oxidation gas feeding passage and adsorbs impurities contained in oxidation gas; an impurity outlet passage that connects the oxidation gas feeding passage downstream of the impurity adsorbing means to outside without going through the fuel cell; an impurity emitting means that causes emission of impurities adsorbed by the impurity adsorbing means from the impurity adsorbing means; a flow path regulating means that leads impurities emitted by the impurity emitting means to the impurity outlet passage; and a diluting means that dilutes impurities emitted by the impurity emitting means.

The fuel cell system according to the present invention has an impurity adsorbing means that is disposed on an oxidation gas feeding passage for feeding oxidation gas to a fuel cell, and can use the impurity adsorbing means to adsorb impurities contained in oxidation gas. The impurities are gaseous components (impurities) such as carbon hydride, nitrogen oxide, sulfur compound, carbon monoxide, hydrogen sulfate, and the like contained in the atmosphere. Through the adsorption of such impurities, it is possible to reduce deterioration of the fuel cell stack due to the impurities and also reduce negative influence accompanying the same such as decrease in generating efficiency and the like.

In addition, since the fuel cell system according to the present invention includes an impurity emitting means that causes emission of adsorbed impurities and a diluting means that dilutes emitted impurities, impurities adsorbed from oxidation gas can be readily diluted and can be output from the system. This allows for regeneration of the impurity adsorbing means and also for continuous removal of impurities in oxidation gas.

Furthermore, since the fuel cell system according to the present invention includes an impurity outlet passage and a flow path regulating means that leads emitted impurities to the impurity outlet passage, the impurities can be output from the system without going through the fuel cell. That is to say, the impurities can be prevented from flowing into the fuel cell, and deterioration of the fuel cell stack can be avoided.

In addition, the fuel cell system according to the present invention may preferably be characterized in including an oxidation gas feeding means that is disposed on the oxidation gas feeding passage and feeds oxidation gas to the fuel cell, and the diluting means may dilute impurities by feeding oxidation gas by the oxidation gas feeding means.

The oxidation gas feeding means includes both a function of feeding oxidation gas to the fuel cell and a function of diluting impurities. By having such configuration, it is possible to facilitate simplification of configuration, reduction in number of components, and economization on space.

Also, the fuel cell system according to the present invention may preferably be characterized in that the impurity adsorbing means is activated carbon, and the impurity emitting means may be configured to heat the activated carbon so as to cause emission of impurities adsorbed in the impurity adsorbing means.

The activated carbon has a property of adsorbing materials at a predetermined low temperature and emitting the adsorbed materials at a predetermined high temperature that is higher than the predetermined low temperature. Accordingly, by having such configuration that activated carbon is used as the impurity adsorbing means and the impurity emitting means is used to heat the activated carbon, impurities can be adsorbed and removed from oxidation gas at the predetermined low temperature and the adsorbed impurities can be output from the system at the predetermined high temperature.

The predetermined low temperature can be set appropriately by processing the activated carbon, and is set based on an operating temperature of the fuel cell, an arrangement of the system, and the like such that the adsorption can be conducted at the operating temperature of the fuel cell. In addition, the predetermined high temperature should be set to a level of temperature that is higher than the temperature during operation of the fuel cell such that no impurity is emitted during operation of the fuel cell. For example, if the operating temperature of the fuel cell is approximately 80 degrees Celsius, the predetermined low temperature should be set to a temperature not higher than 100 degrees Celsius and the predetermined high temperature should be set to a temperature not lower than 150 degrees Celsius such that impurities are adsorbed but not emitted during operation of the fuel cell.

The present invention can also be configured from an aspect of emission density of the above-mentioned impurities. In this aspect, the present invention is a fuel cell system that is characterized in including: a fuel cell that obtains electric power through electrochemical reaction between hydrogen gas and oxidation gas; an oxidation gas feeding passage for passage of oxidation gas fed to the fuel cell; an impurity adsorbing means that is disposed on the oxidation gas feeding passage and adsorbs impurities contained in oxidation gas; an impurity outlet passage that connects the oxidation gas feeding passage downstream of the impurity adsorbing means to outside without going through the fuel cell; an impurity emitting means that causes emission of impurities adsorbed by the impurity adsorbing means from the impurity adsorbing means; a flow path regulating means that leads impurities emitted by the impurity emitting means to the impurity outlet passage; and an emission density limiting means that, at the time that impurities emitted by the impurity emitting means are passed through the impurity outlet passage and are emitted outside, limits a density of the impurities to be less than or equal to a predetermined density. The predetermined density is a density of impurities that can avoid negative influence on outside systems including the system itself at the time that the impurities are output from the system, and may be set appropriately. In the fuel cell system thus configured, it is possible to emit impurities outside, in a way not going through the fuel cell and also in a state that does not have influence on the system.

And, the emission density limiting means may be a diluter that is disposed at the impurity outlet passage, and the diluter may dilute impurities emitted by the impurity emitting means, thereby making a density of the impurities less than or equal to the predetermined density at the time that the impurities are emitted outside. Alternatively, the emission density limiting means may also be a flow rate regulating valve that is disposed at the impurity outlet passage, and the flow rate regulating valve may regulate a flow rate of off-gas that contains impurities and flows through the impurity outlet passage, thereby making a density of the impurities less than or equal to the predetermined density at the time that the impurities are emitted outside.

Effect of the Invention

In accordance with the fuel cell system according to the present invention, since impurities contained in oxidation gas to be fed to the fuel cell can be removed effectively and the removed impurities are output from the system after being diluted or the like to have a reduced density, the removed impurities can be prevented from exerting negative influence on outside systems and the like including the system itself. Also, since the impurity adsorbing means can be readily regenerated and impurities can be output from the system while avoiding deterioration of the fuel cell, continuous processing is allowed.

BEST MODE FOR EMBODYING THE INVENTION

Modes for embodying a fuel cell system according to the present invention will now be described in detail with reference to the drawings.

Embodiment 1

Figure 1:
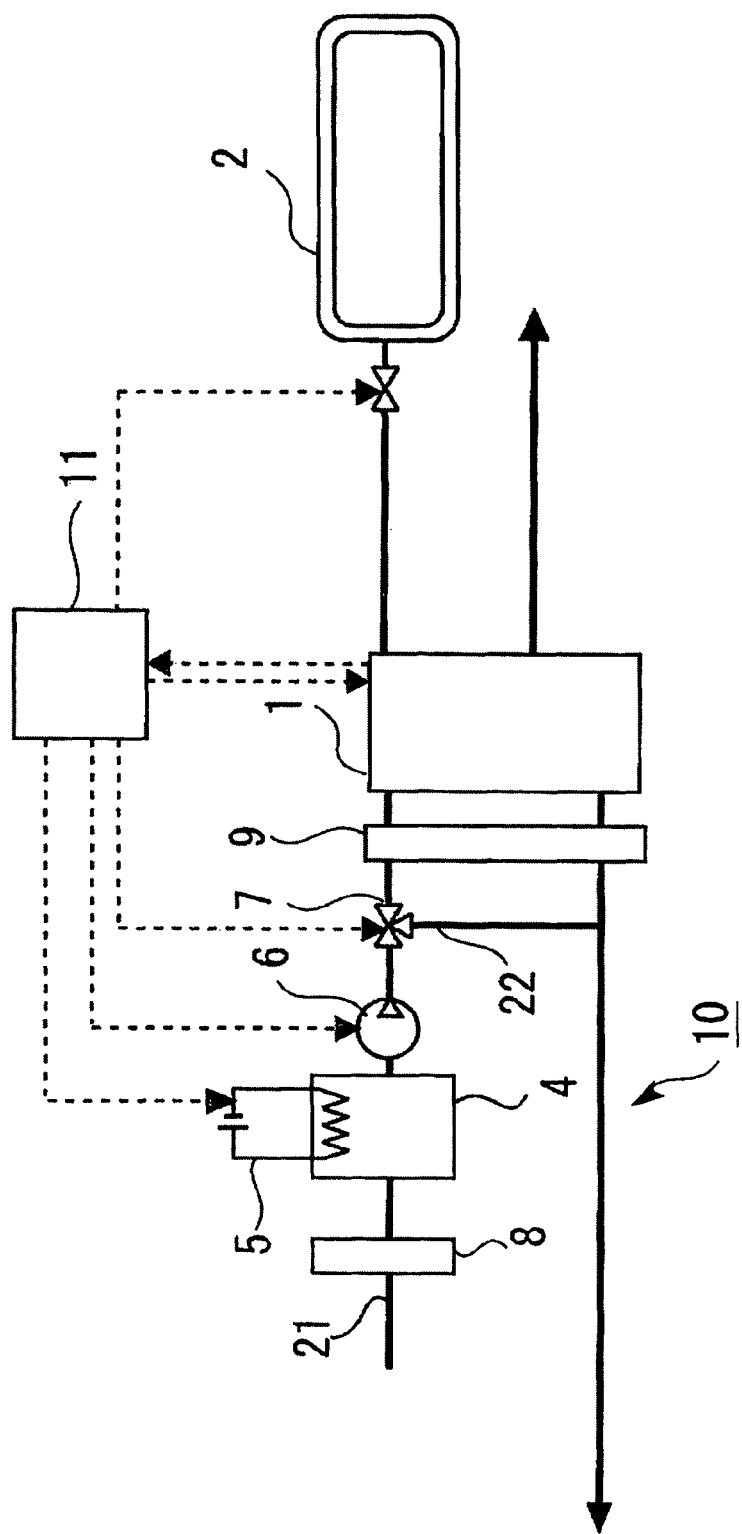
FIG. 1 is a configuration diagram of a fuel cell system according to an embodiment.

FIG. 1 is a system configuration diagram of a fuel cell system 10 according to an embodiment. This fuel cell system 10 includes: a fuel cell 1; a high pressure hydrogen tank 2 that stores hydrogen gas as fuel gas and feeds the hydrogen gas to the fuel cell 1; an oxidation gas feeding passage 21 for passage of oxidation gas fed to the fuel cell 1; an adsorbent 4 that is disposed on the oxidation gas feeding passage 21 and serves as an impurity adsorbing means for adsorbing impurities of oxidation gas passing therein; a heater 5 that serves as an impurity emitting means for heating the adsorbent 4; an air compressor 6 that serves as an oxidation gas feeding and diluting means for leading air in the atmosphere to the fuel cell 1 as oxidation gas and for diluting impurities emitted from the adsorbent 4; an impurity outlet passage 22 that connects the oxidation gas feeding passage 21 downstream of the adsorbent 4 to outside of the system 10; a three-way valve 7 that is disposed at a communicating portion between the oxidation gas feeding passage 21 and the impurity outlet passage 22 and serves as a flow path regulating means for regulating the flow path of oxidation gas and impurities passing through the oxidation gas feeding passage 21; a filter 8 that is disposed on the oxidation gas feeding passage 21 upstream of the adsorbent 4; and a humidifier 9 that is disposed on the oxidation gas feeding passage 21 downstream of the three-way valve 7.

The fuel cell 1 obtains electric energy by electrochemically reacting hydrogen gas and oxidation gas via an electrolyte. The fuel cell 1 is a polymer electrolyte membrane fuel cell, i.e. a type of fuel cell that is commonly used for electrical vehicles running on fuel cells as power supplies.

The air compressor 6 feeds air in the atmosphere outside of the system as oxidation gas to the fuel cell 1. Since the oxidation gas is led from the atmosphere to the fuel cell 1 as described above, the oxidation gas may sometimes contain gaseous components (impurities) such as carbon hydride, nitrogen oxide, sulfur compound, carbon monoxide, hydrogen sulfate, and the like contained in the atmosphere, and particulates (impurities) such as particles, dusts, debris, and the like. In order to remove the particulates, the filter 8 for removing particulates of oxidation gas is disposed upstream of the air compressor 6.

Furthermore, in order to remove the gaseous components, the adsorbent 4 is disposed on the oxidation gas feeding passage 21 downstream of the filter 8. The adsorbent 4 is activated carbon, and adsorbs impurities at an operating temperature of the fuel cell 1. A heater 5 is placed at the adsorbent 4 and is capable of heating the adsorbent 4. The adsorbent 4 is at a substantially same temperature as the fuel cell 1 during normal operation of the fuel cell 1, and has been processed in advance to adsorb impurities at the operating temperature. In addition, heating the adsorbent 4 by the heater 5 allows for emission of adsorbed impurities from the adsorbent 4. The temperature that allows for emission of impurities from the adsorbent 4 is higher than the operating temperature of the fuel cell 1, and is set such that no impurity is emitted at the time of power generation by the fuel cell 1.

The heater 5 is controlled by an ECU 11, and is configured to heat the adsorbent 4 and cause emission of impurities from the adsorbent 4 at the time that power generation by the fuel cell 1 is stopped, such as at the time that electric vehicle is stopped. The ECU 11 also controls the air compressor 6 to feed air to emitted impurities at the time that the adsorbent 4 is heated (at the time that causes emission of impurities from the adsorbent 4). In this way, impurities emitted from the adsorbent 4 can be diluted and output from the system.

The three-way valve 7 is disposed at the communicating portion between the oxidation gas feeding passage 21 and the impurity outlet passage 22, and allows oxidation gas and impurities passing through the oxidation gas feeding passage 21 to flow into the fuel cell 1 or to the impurity outlet passage 22. Specifically, at the time of normal power generation by the fuel cell, that is, at the time that oxidation gas is fed to the fuel cell 1, the three-way valve 7 blocks the flow path toward the impurity outlet passage 22 and opens the oxidation gas feeding passage 21 so as to lead the fed oxidation gas to the fuel cell 1. Also, at the time that impurities are emitted from the adsorbent 4 and are output from the system, the three-way valve 7 blocks the flow path of the oxidation gas feeding passage 21 on the fuel cell 1 side so as to lead the impurities to the impurity outlet passage 22. Appropriately regulating the flow path by the three-way valve 7 in this manner can prevent impurities from flowing into the fuel cell 1 at the time that the impurities are output.

The ECU 11 controls an amount of hydrogen to be fed from the high pressure hydrogen tank 2, heating of the adsorbent 4 by the heater 5, an amount of air to be fed by the air compressor 6, and selection of the flow path by the three-way valve 7.

Figure 2:
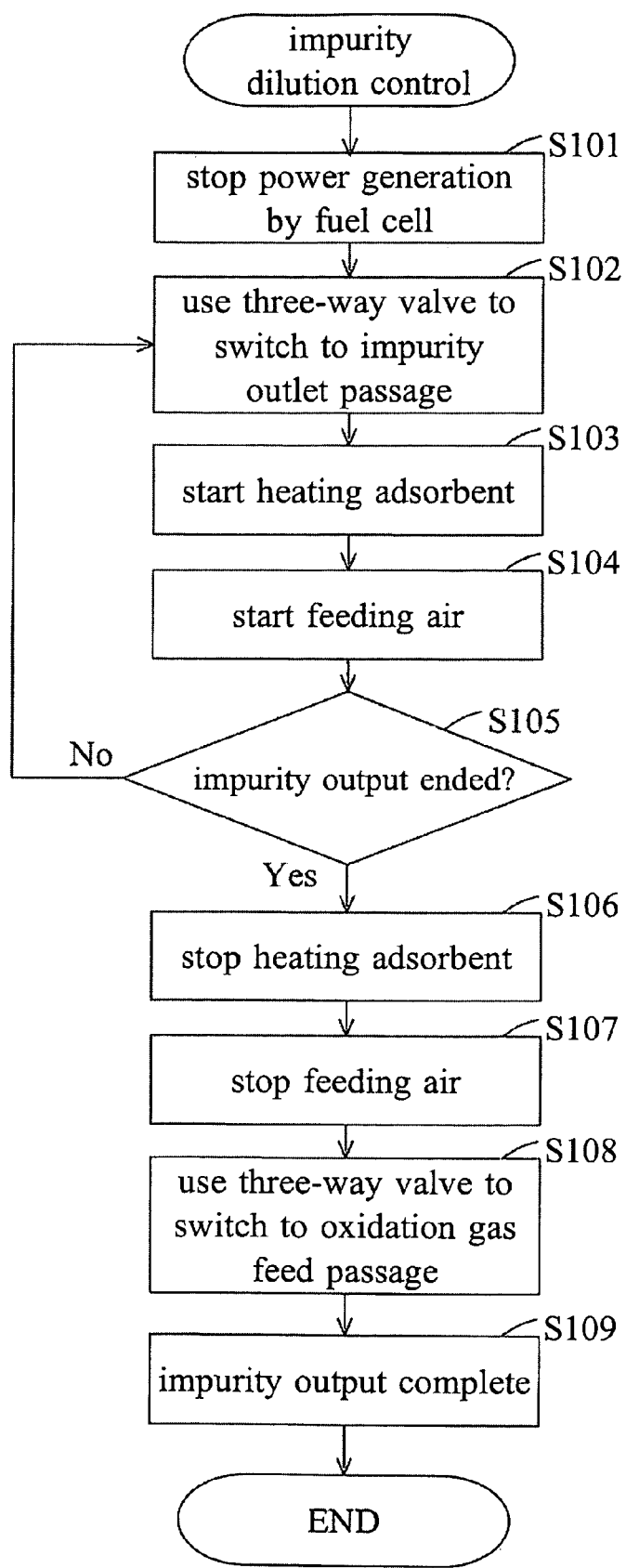
FIG. 2 is a flowchart that shows impurity output control.

The following describes in detail impurity output control in the fuel cell system 10 that is configured as above. Each control described below is executed by the ECU 11. Also, note that the impurity output control according to the present embodiment is a type of control that is executed at the time that power generation by the fuel cell 1 is stopped, such as at the time that electric vehicle is stopped, and is repeatedly executed at regular time intervals or at regular travel distances. FIG. 2 is a flowchart that shows the impurity output control.

At the time that electric vehicle is stopped or the like, the ECU 11 stops power generation by the fuel cell 1 to subject the adsorbent 4 to a regenerating process (step 101). After the power generation by the fuel cell 1 is stopped, the three-way valve 7 blocks the flow path of oxidation gas that leads to the fuel cell 1 and switches the flow path of oxidation gas to the impurity outlet passage 22 (step 102). At the time of power generation by the fuel cell 1, the three-way valve 7 blocks the flow path toward the impurity outlet passage 22 and opens the flow path toward the fuel cell 1 in order to feed oxidation gas to the fuel cell 1. To the contrary, at the time that impurities are emitted, the three-way valve 7 opens the flow path toward the impurity outlet passage 22 and blocks the flow path toward the fuel cell 1 in order to prevent impurities from flowing into the fuel cell 1. Next, the adsorbent 4 is heated by the heater 5 (step 103). The heating causes impurities that have been adsorbed in the adsorbent 4 during power generation by the fuel cell 1 to be emitted from the adsorbent 4.

Next, the air compressor 6 feeds air to the impurity outlet passage 22 (step 104). This causes the impurities emitted from the adsorbent 4 to be diluted and be flowed into the impurity outlet passage 22. Since the impurity outlet passage 22 connects to outside of the system, the flowed-in impurities are diluted into air and are output from the system.

After the output of impurities has been started, the ECU 11 determines whether or not to terminate the process of impurity output (step 105). As a way to make determination on whether or not to terminate the process of impurity output, for example, it is possible to make determination based on whether or not a predetermined time period required for the output of impurities, which was given in advance by an experiment or the like, has elapsed since the output of impurities was started. As a result of the determination, if the output of impurities is to be continued, the adsorbent 4 is heated again by the heater 5 (step 103) and the process of impurity output is continued. On the other hand, if the process of impurity output is to be terminated, the heating by the heater 5 is stopped (step 106), and the air compressor 6 is stopped only after the temperature of the adsorbent 4 has dropped to a level of temperature not higher than a predetermined temperature that does not cause emission of impurities from the adsorbent 4 (step 107). The predetermined temperature is a level of temperature that causes the adsorbent 4 not to emit impurities but to adsorb impurities. Since impurity is not emitted after the temperature of the adsorbent 4 has dropped to a level not higher than the predetermined temperature, the three-way valve 7 blocks the impurity outlet passage 22 and switches the flow path to the oxidation gas feeding passage 21 on the fuel cell 1 side (step 108). The process of impurity output is thus complete (step 109).

As described above, in accordance with the fuel cell system 10 according to the present embodiment, impurities contained in oxidation gas can be adsorbed by the adsorbent 4 at the time of power generation by the fuel cell 1. Also, after a certain amount of impurities has been adsorbed by the adsorbent 4, the impurities can be emitted from the adsorbent 4 to regenerate the adsorbent 4. This allows for continuous removal of impurities without requiring maintenance of the adsorbent 4 such as a replacement or the like. Furthermore, in the process of impurity output, the impurities are diluted and are output from the system without going through the fuel cell 1. This allows for reduction of negative influence on outside systems and the like including the system itself, and also allows for prevention of deterioration of the fuel cell stack.

In the present embodiment, the air compressor 6 as a diluting means is placed at the oxidation gas feeding passage 21. However, all that is required for the diluting means is to be capable of diluting impurities emitted from the adsorbent. Accordingly, the diluting means may also be placed at the impurity outlet passage 22. Furthermore, in the present embodiment, impurities are diluted by the air compressor 6 by feeding oxidation gas from the atmosphere. However, an air introducing means used for dilution may also be provided in addition to the air compressor 6 used for feeding of oxidation gas.

As described above, all that is required for the fuel cell system according to the present invention is to be capable of adsorbing and diluting impurities contained in oxidation gas and of outputting them from the system. Accordingly, the fuel cell system is not restricted to the present embodiment described above and may include any of these combinations if at all possible.

Second Embodiment

Figure 3:
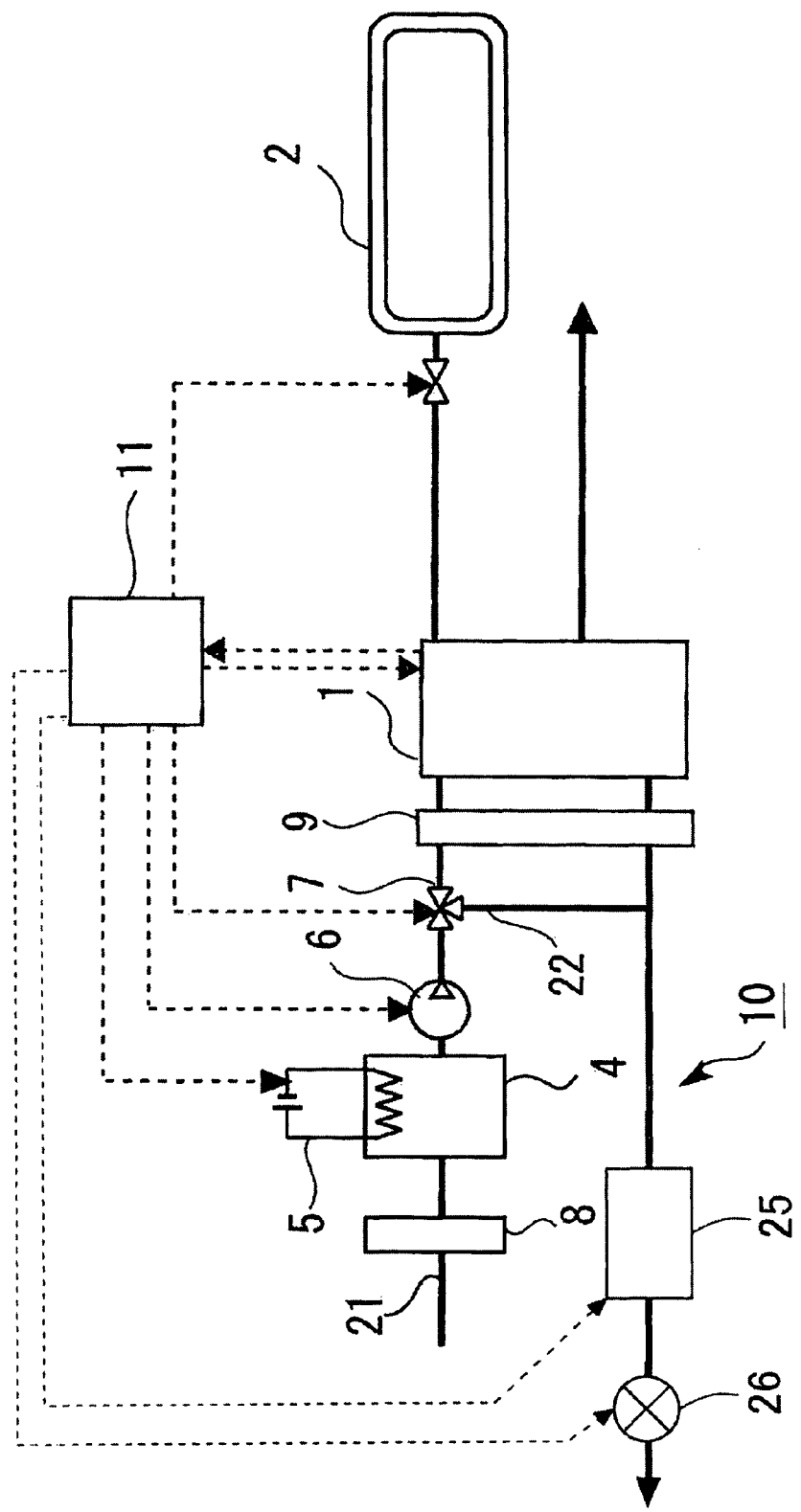
FIG. 3 is a second configuration diagram of a fuel cell system according to an embodiment.

Next, a second embodiment of the fuel cell system according to the present invention is described based on FIG. 3. Since some components of the fuel cell system shown in FIG. 3 have commonality with the components of the fuel cell system of the first embodiment shown in FIG. 1, such common components are indicated by the same reference numbers as those in the first embodiment and are not described in detail.

In the fuel cell system according to the present embodiment, a diluter 25 and a flow rate regulating valve 26 are disposed downstream of an impurity outlet passage 22 (at sites more close to outside of the system). The diluter 25 is a device for diluting off-gas that flows through the impurity outlet passage 22, and diluting performance of the diluter 25 is controlled by an ECU 11. Specifically, secondary air used for dilution is introduced into the diluter 25, and the diluting performance of the diluter 25 is controlled by the ECU 11 by regulating an amount of secondary air to be introduced. In addition, the flow rate regulating valve 26 is disposed downstream of the diluter 25 and regulates a flow rate of off-gas that flows through the impurity outlet passage 22 according to an instruction from the ECU 11. An air compressor 6 in the present embodiment is driven at the time that air is required to be fed as oxidation gas to a fuel cell 1.

In the fuel cell system according to the present embodiment, impurities in oxidation gas are adsorbed by an adsorbent 4 as in the first embodiment described previously. And then, in order to emit the adsorbed impurities out of the system, the adsorbent 4 is heated by the heater 5 and the flow path of oxidation gas is switched to the impurity outlet passage 22 by using a three-way valve 7. In this way, the emitted impurities are prevented from being fed to the fuel cell 1. And, at the same time, the diluter 25 conducts dilution of off-gas to be emitted out of the system such that a density of impurities in the off-gas becomes not greater than a predetermined density. The predetermined density is a level of density that can avoid negative influence on outside systems and the like including the system itself at the time that the impurities are output from the system.

At this time, as the density of impurities in off-gas, an amount of secondary air to be introduced into the diluter 25 is regulated by using a value detected by a density sensor (not shown) disposed downstream of the diluter 25, such that the detected value becomes less than or equal to the above-mentioned predetermined density. Alternatively, a provisional impurity density may be calculated based on an amount of impurity emission that is estimated from a history record of feeding of oxidation gas in the fuel cell 1 (for example, a history record of operating duty of the fuel cell 1 or the like), and the diluter 25 may be controlled such that the calculated value becomes less than or equal to the above-mentioned predetermined density.

Furthermore, in case where the dilution of off-gas by the diluter 25 is not sufficient, a degree of opening of the flow rate regulating valve 26 is regulated such that the flow rate of off-gas is narrowed down and the density of impurities to be emitted outside becomes less than or equal to the above-mentioned predetermined density. The degree of opening of the flow rate regulating valve 26 is determined based on a density of impurities in off-gas, an amount of impurities that is estimated to be emitted from the adsorbent 4, and the like. The regulation of degree of opening of the flow rate regulating valve 26 may be conducted not only at the time that the diluting performance of the diluter 25 is not sufficient as in the case described above, but may also be conducted independently at the time that the diluter 25 is not in operation. Furthermore, although the flow rate regulating valve 26 is disposed downstream of the diluter 25 in the present embodiment, the flow rate regulating valve 26 may also be disposed alone without accompanying the diluter 25, thereby regulating a density of impurities to be emitted outside.

As described above, in the fuel cell system according to the present embodiment, the diluter 25 or the flow rate regulating valve 26 can be used to make a density of impurities at a level that can avoid negative influence on the system, and also, deterioration of the fuel cell stack can be prevented.

INDUSTRIAL APPLICABILITY

The fuel cell system according to the present invention is capable of conducting power generation without being influenced by impurities contained in oxidation gas fed to the fuel cell. For example, it is not only preferably applicable to fuel cell systems for electric vehicles, but is also applicable to various fuel cell systems.

What is claimed is:

1. A fuel cell system comprising:
   a fuel cell that obtains electric power through electrochemical reaction between hydrogen gas and oxidation gas;
   an oxidation gas feeding passage for passage of oxidation gas fed to the fuel cell;
   an impurity adsorbing portion that is disposed on the oxidation gas feeding passage and adsorbs impurities contained in oxidation gas;
   an impurity outlet passage that connects the oxidation gas feeding passage downstream of the impurity adsorbing means to outside without going through the fuel cell;
   an impurity emitting portion that causes emission of impurities adsorbed by the impurity adsorbing portion from the impurity adsorbing portion;
   a flow path regulating portion that leads impurities emitted by the impurity emitting portion to the impurity outlet passage; and
   a diluting portion that dilutes impurities emitted by the impurity emitting portion.

2. A fuel cell system in accordance with claim 1, further comprising:
   an oxidation gas feeding portion that is disposed on the oxidation gas feeding passage and feeds oxidation gas to the fuel cell,
   wherein the diluting portion dilutes impurities by feeding oxidation gas by the oxidation gas feeding portion.

3. A fuel cell system in accordance with claim 2, wherein the flow path regulating portion is a three-way valve that is disposed at a communicating portion between the oxidation gas feeding passage and the impurity outlet passage, and
the diluting portion feeds oxidation gas by the oxidation gas feeding portion in a state where feeding of oxidation gas to the fuel cell is blocked by the three-way valve in the oxidation gas feeding passage.

4. A fuel cell system in accordance with claim 2, wherein the diluting portion feeds oxidation gas by the oxidation gas feeding portion at the time that no power generation is conducted by the fuel cell.

5. A fuel cell system comprising:
a fuel cell that obtains electric power through electrochemical reaction between hydrogen gas and oxidation gas;
an oxidation gas feeding passage for passage of oxidation gas fed to the fuel cell;
an impurity adsorbing portion that is disposed on the oxidation gas feeding passage and adsorbs impurities contained in oxidation gas;
an impurity outlet passage that connects the oxidation gas feeding passage downstream of the impurity adsorbing portion to outside without going through the fuel cell;
an impurity emitting portion that causes emission of impurities adsorbed by the impurity adsorbing portion from the impurity adsorbing;
a flow path regulating portion that leads impurities emitted by the impurity emitting portion to the impurity outlet passage; and
an emission density limiting portion that, at the time that impurities emitted by the impurity emitting portion are passed through the impurity outlet passage and are emitted outside, limits a density of the impurities to be less than or equal to a predetermined density.

6. A fuel cell system in accordance with claim 5, wherein the emission density limiting portion is a diluter that is disposed at the impurity outlet passage, the diluter diluting impurities emitted by the impurity emitting portion, thereby making a density of the impurities less than or equal to the predetermined density at the time that the impurities are emitted outside.

7. A fuel cell system in accordance with claim 5, wherein the emission density limiting portion is a flow rate regulating valve that is disposed at the impurity outlet passage, the flow rate regulating valve regulating a flow rate of off-gas that contains impurities and flows through the impurity outlet passage, thereby making a density of the impurities less than or equal to the predetermined density at the time that the impurities are emitted outside.

8. A fuel cell system in accordance with claim 1, wherein the impurity adsorbing portion is activated carbon, and
the impurity emitting portion heats the activated carbon, thereby causing emission of impurities adsorbed in the impurity adsorbing portion.

9. A fuel cell system in accordance with claim 8, wherein the activated carbon adsorbs impurities in oxidation gas at the time of power generation by the fuel cell and emits the adsorbed impurities at the time that a temperature of the activated carbon reaches a predetermined high temperature that is higher than the temperature during power generation by the fuel cell.

10. A fuel cell system in accordance with claim 5, wherein the impurity adsorbing portion is activated carbon, and
the impurity emitting portion heats the activated carbon, thereby causing emission of impurities adsorbed in the impurity adsorbing portion.

11. A fuel cell system in accordance with claim 10, wherein the activated carbon adsorbs impurities in oxidation gas at the time of power generation by the fuel cell and emits the adsorbed impurities at the time that a temperature of the activated carbon reaches a predetermined high temperature that is higher than the temperature during power generation by the fuel cell.

* * * * *

UNITED STATES PATENT AND TRADEMARK OFFICE
CERTIFICATE OF CORRECTION

PATENT NO. : 7,939,208 B2
APPLICATION NO. : 12/084053
DATED : May 10, 2011
INVENTOR(S) : Toyokazu Baika Page 1 of 1

It is certified that error appears in the above-identified patent and that said Letters Patent is hereby corrected as shown below:

| Column | Line | |
|---|---|---|
| 8 | 61 | Change "A fuel cell" to --The fuel cell--. |
| 9 | 27 | After "the impurity adsorbing" insert --portion--. |
| 9 | 1 | Change "A fuel cell" to --The fuel cell--. |
| 9 | 9 | Change "A fuel cell" to --The fuel cell--. |
| 9 | 36 | Change "A fuel cell" to --The fuel cell--. |
| 10 | 5 | Change "A fuel cell" to --The fuel cell--. |
| 10 | 13 | Change "A fuel cell" to --The fuel cell--. |
| 10 | 18 | Change "A fuel cell" to --The fuel cell--. |
| 10 | 25 | Change "A fuel cell" to --The fuel cell--. |
| 10 | 30 | Change "A fuel cell" to --The fuel cell--. |

Signed and Sealed this
Thirteenth Day of December, 2011

David J. Kappos
*Director of the United States Patent and Trademark Office*